Feb. 14, 1956  D. J. STEWART  2,734,384
NUTATION DAMPER
Filed Aug. 24, 1954
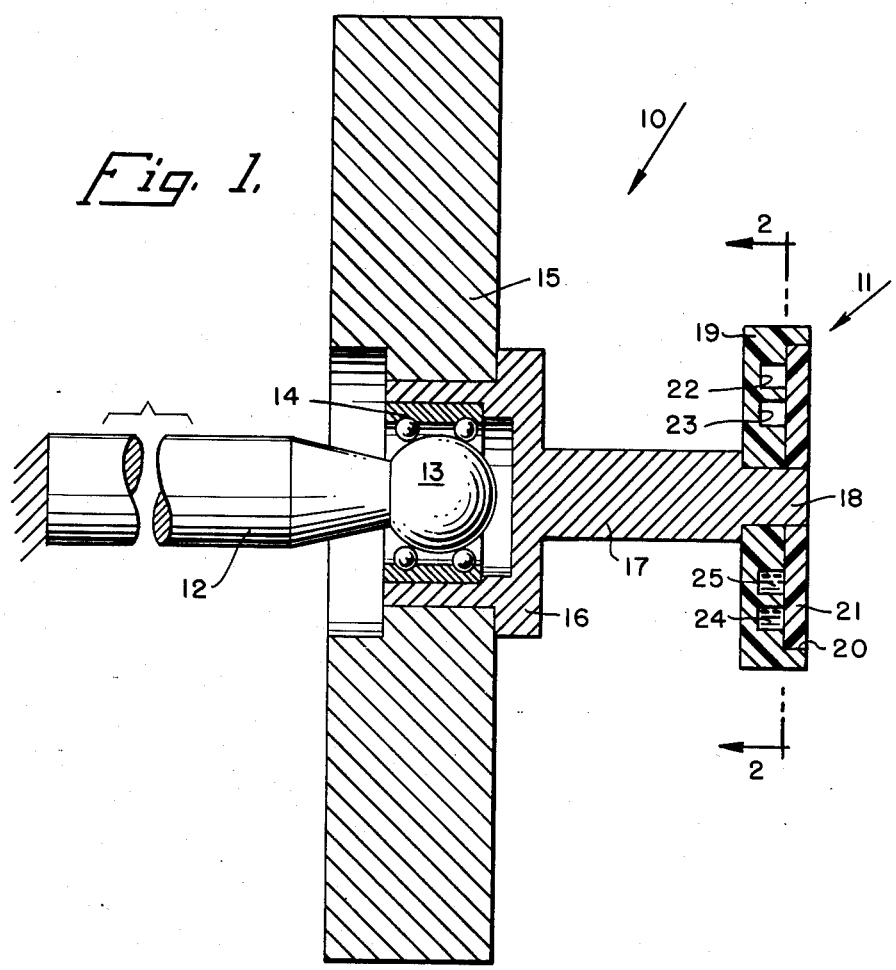
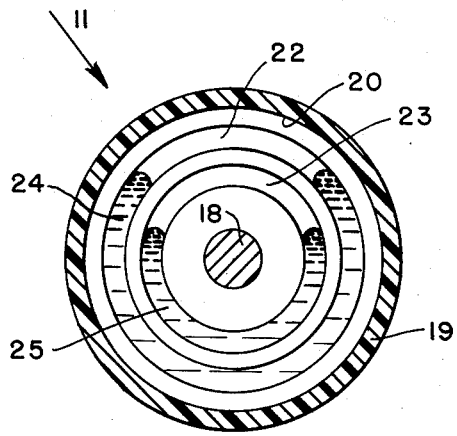
INVENTOR.
DONALD J. STEWART
BY
*G. D. O'Brien*
ATTORNEY

2,734,384

NUTATION DAMPER

Donald J. Stewart, China Lake, Calif.

Application August 24, 1954, Serial No. 451,990

8 Claims. (Cl. 74—5.5)

(Granted under Title 35, U. S. Code (1952), sec. 266)

The invention described herein may be manufactured and used by or for the Government of the United States of America for governmental purposes without the payment of any royalties thereon or therefor.

The present invention relates to gyroscopic devices and has more particular reference to an arrangement for rapidly damping out nutational movements of a gyroscope rotor.

The nutation damper of this invention is intended primarily, tho not exclusively, for use on a gyroscope of the type comprising a fixed supporting shaft having a gyro rotor rotatably and universally mounted on one end thereof whereby the rotor may rotate on the shaft and orientation of the plane of rotation of the rotor relative to the shaft axis may vary. If a gyroscope of the above described construction is subjected, for example, to an impact, or other momentary unbalancing force, the rotor will undergo nutational movements which, upon removal of this unbalancing force, will be gradually damped out owing to inherent friction in the system. In certain applications employing such gyroscopes, it is desirable that the nutation damping period be appreciably shortened. The present invention provides a device for effecting rapid damping out of such nutational movements which device is simple in construction and operation, small in size, and inexpensive whereby to render it especially suitable for use in certain applications where such characteristics are desirable or especially necessary. In general, the invention comprises a disc-like element having formed therein one or more sealed annular passages or raceways which contain predetermined and relatively minute amounts of a relatively dense liquid such as mercury. The disc-like element is concentrically mounted on the rotor shaft, in a manner hereinafter more carefully described. As will be seen from the ensuing detailed description of the invention, the mercury, or other dense liquid, contained in the raceways within the disc is so distributed upon rotation of the rotor as to form, in effect, a ring element against which the sides of the raceway beat during nutation of the rotor which beating action acts to rapidly damp out nutation.

In accordance with the foregoing, an object of the present invention is the provision of a nutation damping arrangement for gyroscopes.

Another object of the invention is the provision of an arrangement for rapidly damping nutational movements of a gyro arising as the result of the momentary application of an unbalancing force to the rotor.

Still another object of the invention is the provision of a nutation damper for gyroscopes of the type comprising a fixed supporting shaft and a gyro rotor universally and rotatably mounted on one end thereof and wherein the damper comprises a relatively minute mass of a relatively dense liquid confined in one or more sealed annular raceways formed in a disc-like element fixed to the rotor shaft which liquid, upon rotation of the rotor, is distributed to form, in effect, an annular mass against which the sides of the raceway beat during nutational movements of the rotor with the resultant rapid damping out of such movements.

Further objects and many of the attendant advantages of the invention will become apparent as the same becomes better understood from the following detailed description had in conjunction with the annexed drawings wherein:

Fig. 1 is a longitudinal section through a gyroscopic device embodying the nutation damping arrangement of the present invention; and Fig. 2 is a transverse cross-section taken along line 2—2 of Fig. 1.

Referring now to the drawings and more particularly to Fig. 1, 10 denotes a gyroscope assembly, embodying the nutation damper 11 of the present invention and comprising a supporting shaft 12 which is fixed at one end to some supporting structure as indicated. Shaft 12 has a spherical portion 13 formed at its free end on which is mounted a double race ball bearing unit 14. Spherical portion 13 and ball bearing unit 14 form a universal and rotary connection between supporting shaft 12 and rotor 15 of the gyroscopic assembly which rotor has a central hollow hub portion 16 in which the bearing unit 14 is fixed as by press fitting the outer race of the bearing unit into the hub portion. Hub portion 16 is provided with an axial projection 17 terminating in a reduced end portion 18 on which is secured, as by means of a force fit, a substantially disc-like member 19 forming one part of the nutation damper 11. Disc member 19 has formed in one face thereof a circular recessed portion 20 in which is fixed a disc-like cover element 21. Member 19 has formed therein annular grooves 22 and 23 which are closed by cover element 21 whereby to form closed or sealed annular raceways. While the raceways have been illustrated as being two in number, one or more such raceways may be employed depending on the particular application in which the assembly is to be employed. Partially filling each of the raceways 22 and 23 are predetermined and relatively minute (fraction of a gram) quantities of a relatively dense liquid 24 and 25, as for example, mercury. The parts are so arranged that the center of gravity of the rotary elements is substantially at the center of the spherical portion 13. Moreover, for the nutation damper to be most effective, the ratio of the polar moment of inertia of the rotary elements to the transverse moment of inertia of those elements should be substantially greater than unity, the exact value of such ratio for maximum damping rate varying with the particular assembly. It has been found, however, for an arrangement substantially as illustrated damping could most quickly be effected with mercury filling ¾ to ⅞ of raceway 22 and mercury filling ½ to ⅝ of raceway 23, and with the above mentioned ratio of moments approximately 1.35.

In operation, the rotor is driven to a desired operating speed by suitable driving means, not illustrated. Centrifugal force acting on the mercury masses in raceways 22 and 23 causes the mercury to become substantially equally distributed about the axis of rotation whereby to form a pair of mercury rings concentric with the axis of rotation. Upon the application of an impact or other momentary unbalancing force to the rotary parts which produces a moment about the center of spherical portion 13, the rotary parts will be caused to undergo nutation. While such unbalance exists the mercury masses in the damper shift toward the unbalance so as to actually increase the latter, which action, as will be apparent, is the opposite to a counterbalancing action wherein the counterbalance mass shifts in a direction opposite to the unbalance so as to effect a balance. The mass of mercury employed is made extremely small, however, that is on the order of a fraction of a gram, so that the additional unbalance created will be negligible. Upon the removal of the unbalancing force, the parts will continue to nutate with decreasing amplitude, the rate of decrease of amplitude being dependent upon the damping present in the system. Where a nutation damper is not employed, the friction in the system will cause gradual damping out of the nutational movements. The present nutation damper increases the damping rate to a point where, visually, the damping appears to be instantaneous. Thus, upon removal of the unbalancing force, the mercury masses in the damper raceways shift back to a position of substantially equal distribution about the geometric axis of the rotary parts whereby to form the aforedescribed rings. As a result of nutation of the parts, the side walls of the raceways beat against the mercury rings with a resultant rapid damping out of such movements. As previously set forth, the number of raceways, and the total mass of mercury employed, necessary to obtain optimum damping rate varies with the geometry of the assembly, the optimum values being determined experimentally.

Obviously, many modifications and variations of the present invention are possible in the light of the above teachings. It is therefore to be understood that within the scope of the appended claims the invention may be practiced otherwise than as specifically described.

What is claimed is:

1. A gyroscopic device comprising a fixed supporting structure, a shaft having one end rotatably and universally connected to said supporting structure, a gyro rotor fixed to the last mentioned shaft, a nutation damper comprising a disc-like element fixed to the free end of said last mentioned shaft and including at least one sealed annular raceway concentric to the rotor axis, and a predetermined quantity of a relatively dense liquid partially filling said raceway.

2. The arrangement according to claim 1 wherein said liquid is mercury.

3. The arrangement according to claim 2 wherein said element has formed therein a plurality of raceways each of which is partially filled with a predetermined quantity of mercury.

4. In a gyroscope of the type comprising a fixed supporting structure, a shaft rotatably and universally connected at one end to said supporting structure, and a gyro rotor fixed to said shaft; the improvements comprising a nutation damper including at least one sealed annular raceway concentric to the rotor axis fixed to the free end of said shaft, and a predetermined quantity of a relatively dense liquid partially filling said raceway.

5. The arrangement according to claim 4 wherein said liquid is mercury.

6. The arrangement according to claim 5 wherein said damper includes a plurality of concentric raceways each of which is partially filled with a predetermined quantity of mercury.

7. A gyroscopic device comprising a supporting structure, a shaft having one end rotatably and universally connected to said supporting structure, a gyro rotor fixed to the last mentioned shaft for rotation therewith about the longitudinal axis of said shaft, a nutation damper comprising a disc-like element fixed to said shaft at a point axially removed from said gyro rotor and including sealed chamber means, and a predetermined quantity of a relatively dense liquid partially filling said sealed chamber means.

8. A gyroscopic device according to claim 7, wherein said sealed chamber means comprises at least one sealed annular raceway concentric to the rotor axis and containing a quantity of said relatively dense liquid.

References Cited in the file of this patent

UNITED STATES PATENTS

| Re. 20,701 | Gillmor | Apr. 19, 1938 |
| 1,987,483 | McDonald | Jan. 8, 1935 |
| 2,087,961 | Anscott | July 27, 1937 |